US012773791B2

(12) United States Patent
Sparks, II

(10) Patent No.: US 12,773,791 B2
(45) Date of Patent: Oct. 27, 2026

(54) ADAPTOR BLOCK FOR USE WITH A VACUUM MATERIAL HANDLER

(71) Applicant: Vacuworx Global, LLC, Tulsa, OK (US)

(72) Inventor: Keith A. Sparks, II, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 1067 days.

(21) Appl. No.: 17/912,225

(22) PCT Filed: Mar. 24, 2021

(86) PCT No.: PCT/US2021/023907
§ 371 (c)(1),
(2) Date: Sep. 16, 2022

(87) PCT Pub. No.: WO2021/188925
PCT Pub. Date: Sep. 23, 2021

(65) Prior Publication Data

US 2023/0182322 A1 Jun. 15, 2023

Related U.S. Application Data

(60) Provisional application No. 62/994,096, filed on Mar. 24, 2020.

(51) Int. Cl.
*B25J 15/06* (2006.01)

(52) U.S. Cl.
CPC ................................. *B25J 15/0616* (2013.01)

(58) Field of Classification Search
CPC ....... B25J 15/06; B25J 15/0616; B65G 47/90; B66C 1/02
USPC .................................... 294/65; 248/62, 74.1
See application file for complete search history.

(56) References Cited

U.S. PATENT DOCUMENTS

| | | | | | |
|---|---|---|---|---|---|
| 675,104 | A | * | 5/1901 | Oberle | |
| 2,539,783 | A | * | 1/1951 | Kirk, Jr. | F16L 3/11 248/62 |
| 3,713,554 | A | * | 1/1973 | Thompson | B66C 1/42 414/731 |
| 3,945,137 | A | | 3/1976 | Ruttershoff | |
| 4,685,714 | A | * | 8/1987 | Hoke | B66C 1/0243 294/81.2 |
| 5,269,486 | A | * | 12/1993 | Hufford | F16B 7/0486 248/74.1 |
| 5,906,341 | A | * | 5/1999 | Brown | F16L 3/227 248/68.1 |

(Continued)

FOREIGN PATENT DOCUMENTS

| | | | |
|---|---|---|---|
| DE | 2749840 | A1 | 5/1979 |
| DE | 202012009437 | U1 | 10/2012 |

*Primary Examiner* — Paul T Chin
(74) *Attorney, Agent, or Firm* — GableGotwals

(57) ABSTRACT

A vacuum material handler (10) has a vacuum beam (12) supported by an adaptor block (60) attached to a rotator (50). A vacuum pad (40) is carried beneath the vacuum beam (12). The vacuum beam (14) has a motor (20) that powers a pump (30). The adaptor block (60) has a body (64) and arms (70/71) having receivers thereon for receiving an upper pin assembly that may be carried by host equipment. The host equipment locates foe upper pin assembly within foe receivers where the upper pin (66) may be clamped into place, thereby conducting all heavy lifting with foe host equipment.

17 Claims, 3 Drawing Sheets

(56) References Cited

U.S. PATENT DOCUMENTS

| | | | | |
|---|---|---|---|---|
| 6,076,778 | A * | 6/2000 | Brown | F16L 3/227 248/70 |
| 6,282,983 | B1 | 9/2001 | Evans | |
| 6,536,717 | B2 * | 3/2003 | Parker | F16L 3/11 248/70 |
| 6,609,343 | B1 * | 8/2003 | Litten | A63B 71/023 403/373 |
| 6,786,111 | B2 * | 9/2004 | Vicars | F16C 7/023 74/579 E |
| 8,083,277 | B1 | 12/2011 | Benjamin et al. | |
| 8,375,711 | B2 * | 2/2013 | Solomon | B66C 13/12 60/486 |
| 9,581,148 | B1 * | 2/2017 | Solomon | F04B 17/00 |
| D905,541 | S * | 12/2020 | Somsack | D8/356 |
| 2009/0056931 | A1 * | 3/2009 | Kruse | E21B 19/161 166/77.51 |
| 2009/0288458 | A1 * | 11/2009 | Lin | B25J 15/0061 70/174 |
| 2010/0183415 | A1 | 7/2010 | Solomon et al. | |

* cited by examiner

ADAPTOR BLOCK FOR USE WITH A VACUUM MATERIAL HANDLER

CROSS REFERENCE TO RELATED APPLICATIONS

This application is the National Phase of PCT Application No. PCT/US2021/023907 filed 24 Mar. 2021 which claims the priority of U.S. Provisional Application No. 62/994,096 entitled ADAPTOR BLOCK FOR USE WITH A VACUUM MATERIAL HANDLER filed Mar. 24, 2020, the contents of which are hereby incorporated by reference.

FIELD OF THE INVENTION

The invention relates to a vacuum material handler. More particularly, the invention relates to an adapter block for use with a vacuum material handler wherein the adapter block utilizes removable service parts including a removable tombstone and bolted caps for facilitating ease of installation.

BACKGROUND OF THE INVENTION

Vacuum material lifters are typically attached to the end of the boom of an excavator, backhoe or other piece of large construction equipment. The vacuum material lifter may be affixed to the boom with an adaptor block that is affixed to a rotator. Vacuum material lifters may be used to move large objects such as pipe, plate steel, traffic barriers and other large heavy objects that, in general, have a smooth, continuous and nonporous surface. These objects may be as heavy as 40 metric tons (about 88,100 lbs) or more. The lifter has a seal that is fixed to a pad. The lifter is configured to create a void space between the inner perimeter of the seal and the pad when the lifter is placed over the object to be lifted.

In operation, an operator lowers the vacuum lifter until the seal on an outer perimeter of the pad comes into contact with the surface of the object to be lifted. Once the entire seal is in contact with the surface of the object, the operator opens a valve, which creates a vacuum between the pad and the surface of the object. Once a sufficient vacuum pressure has been achieved, the operator can then lift the object using the boom of the excavator or other heavy equipment. The forces produced by the vacuum within the void space exert a compressive force on the seal that is relieved once the vacuum is released.

Seals for vacuum lifters are typically fabricated out of sheets of polyisoprene sponge or cellular rubber. These sheets come in various thicknesses. Typically, seals are comprised of two (2) plied thicknesses, each approximately 1 inch thick.

SUMMARY OF THE INVENTION

A vacuum material handler of the invention includes a vacuum beam that carries a motor operatively connected to a pump. A vacuum pad is adjacent a bottom of the vacuum beam. A rotator is affixed to a top of the vacuum beam.

An adaptor block is affixed to the rotator wherein the adapter block has a lower pin receiver, a body and an upper pin. The lower pin receiver is affixed to the rotator and to the body of the adaptor block. The body of the adaptor block has a left arm having an upper end and a right arm having an upper end. Lower clamp portions are affixed to the upper ends of the arms. Upper clamp portions are affixed to the lower clamp portions for defining a receiver therebetween. The upper clamp portions define a central orifice.

A left spacer is received between the left clamp portions and a right spacer is received between the left clamp portions. In one embodiment, the spacers are cylindrical. In another embodiment, the spacer are collets that are received between the clamp portions. The collets each have a top portion and a bottom portion, wherein the top portions each define a longitudinal slot and a flange member for connecting the top portion and the bottom portion.

Locking members, such as orienting bolts, are received in a central or of the upper clamp portions and pass into an orifice, such as a longitudinal slot of the top portions of the collets.

The left and right spacers are received on an upper pin. The spacers may be slidably received on the upper pin, i.e., the left spacer and the right spacer may be moved towards one another to select a narrow setting or may be moved away from one another to select a wide setting.

In use, it is beneficial to mount the upper pin to host equipment and then position the upper pin and spacers within the right and left lower clamp portions. Then, the right and left upper clamp portions may be secured to the lower clamp portions, thereby securing the upper pin to the adapter block.

The ability to install the upper pin in host equipment first, allow the host equipment do all the dangerous and heavy lifting, then bolt the upper clamp segments on, allows tor ease of connection and increased safety.

By installing the upper pin in the host equipment first, the host equipment and the vacuum material handler need not to be level with one another. Instead, the host equipment can deliver the upper pin to the lower clamp segments, and when needed, compress everything into alignment.

Further advantages of the adapter block of the invention include the use of removable service parts. The spacers function as both spacers and bushings. The "cap and block" style clamping mechanism locks the spacers into the pin to set the size and spacing.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Figure 1:
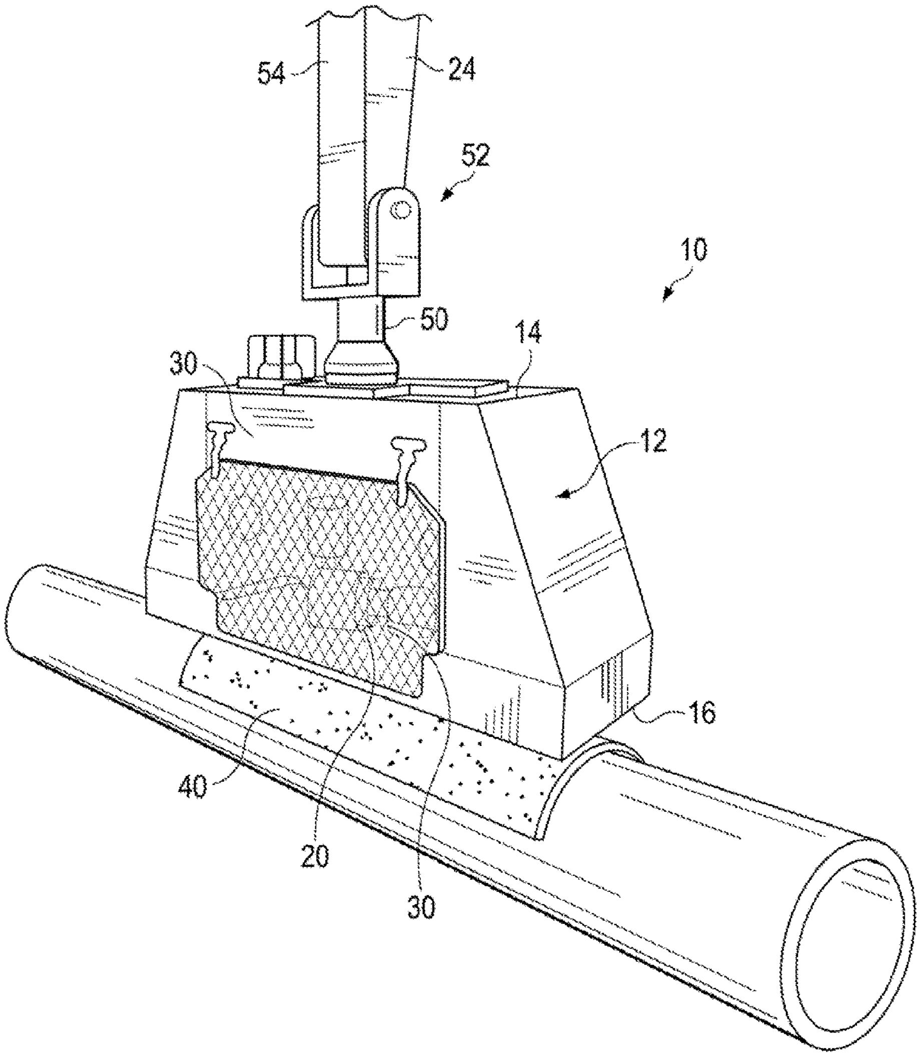
FIG. 1 (PRIOR ART)
FIG. 1 shows a perspective view of a prior art vacuum material handler having an adaptor block affixed for facilitating a connection to a boom of equipment.

Referring now to FIG. 1, described is prior art vacuum material handler 10. Vacuum material handler 10 has vacuum beam 12 having a top 14 and a bottom 16. Motor 20 is located in vacuum beam 12. Pump 30 is also located in vacuum beam 12. Motor 20 is operatively connected to pump 30. Vacuum pad 40 is located adjacent to bottom 16 of vacuum beam 12.

Rotator 50 is affixed to top 14 of vacuum beam 12. Prior art adaptor block 52 is provided for affixing to rotator 50 for affixing to a boom 54 of equipment.

Figure 2:
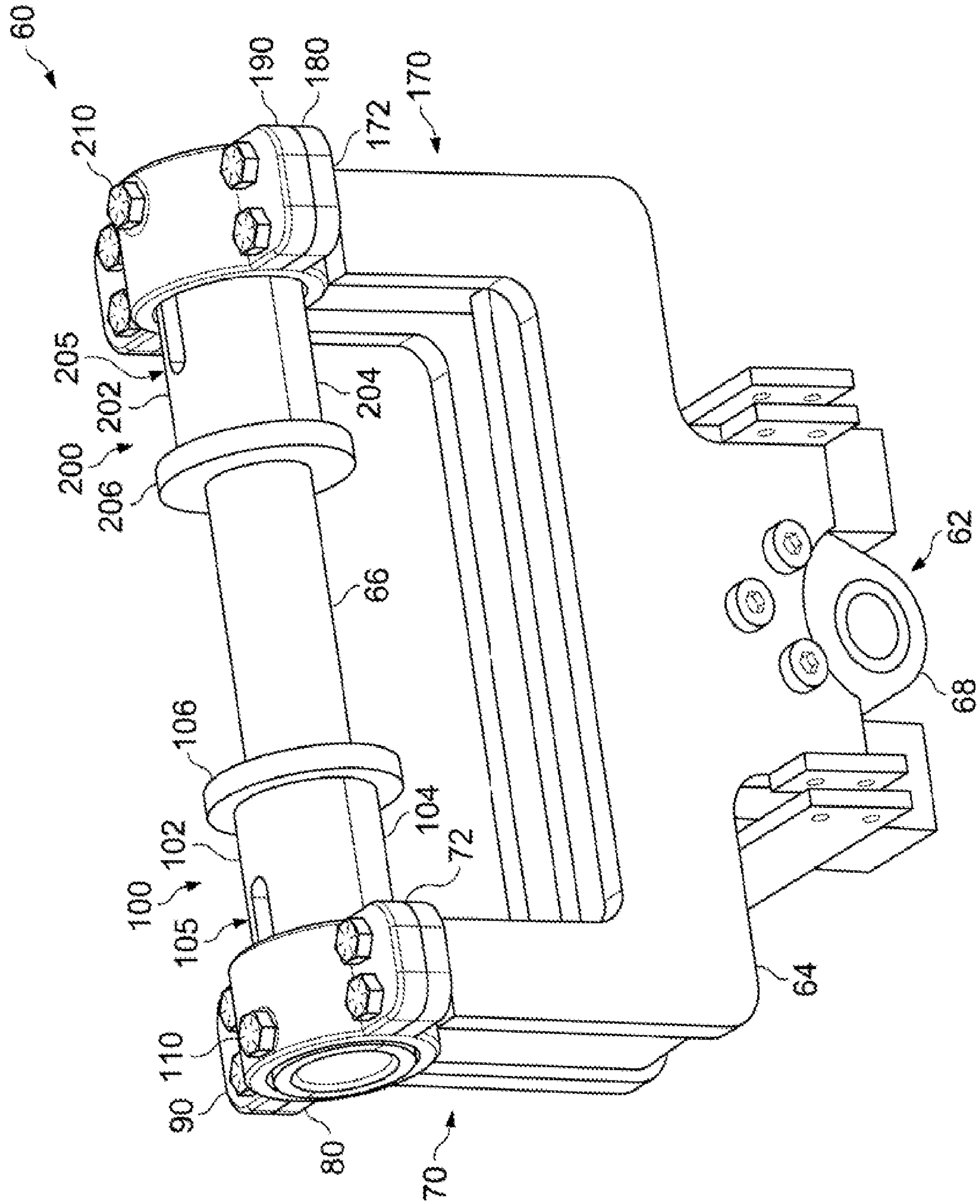
FIG. 2 is an enlarged perspective view of an adaptor block of the invention in a narrow configuration.
Figure 3:
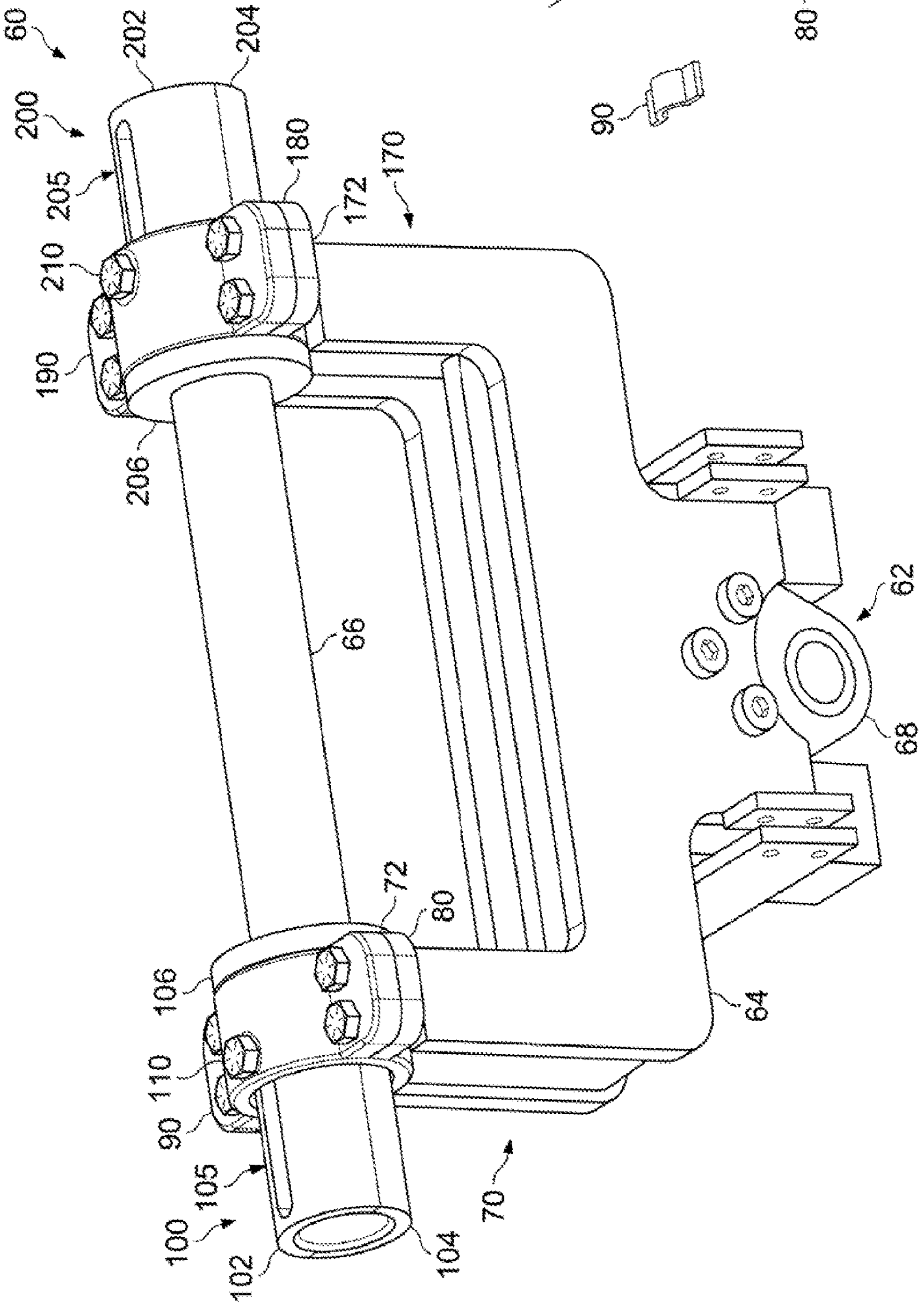
FIG. 3 is an enlarged perspective view of an adaptor block of the invention in a wide configuration.

Referring now to FIGS. 2 and 3, adaptor block 60 of the invention includes lower pin receiver 62, body 64, and upper pin 66. Lower pin receiver 62 is for affixing to rotator 50 of vacuum material handler 10. Lower pin receiver 62 is provided with bushing 68. Lower pin receiver 62 is affixed to body 64 of adaptor block 60.

Body 64 of adaptor block 60 has left arm 70 having an upper end 72.

Left lower clamp portion 80 is affixed to upper end 72 of left arm 70. Left upper clamp portion 90 is affixed to left lower clamp portion 80. Left upper clamp portion 90 defines central orifice (not shown).

Left spacer 100 is received between left upper clamp portion 90 and left lower clamp portion 80. In one embodiment, left spacer 100 is a solid cylinder. In one embodiment, left spacer 100 has an upper surface that defines an left orifice 105, such as a cross drilled pin hole for receiving a left locking member 110, such as a locking pin. In another embodiment, left spacer 100 has top portion 102 and bottom portion 104. Top portion 102 defines left orifice 105, such as a longitudinal slot. Left spacer 100 has left flange member 106, which may be affixed to top portion 102 and bottom portion 104. In one embodiment, left locking member 110 is a left orienting bolt. Left locking member 110 is received in central orifice of left upper clamp portion 90. Left locking member 110 is further received in left orifice 105 of left spacer 100 or, in another embodiment, is received in top portion 102 of left spacer 100.

Body 64 of adaptor block 60 additionally has right arm 170 having upper end 172. Right lower clamp portion 180 is affixed to upper end 172 of right arm 170. Right upper clamp portion 190 is affixed to right lower clamp portion 180. Right upper clamp portion 190 defines a central orifice (not shown).

Right spacer 200 is received between right upper clamp portion 190 and right lower clamp portion 180. In one embodiment, right spacer 200 is a solid cylinder. In one embodiment, right spacer 200 has an upper surface that defines a right orifice 205, such as a cross drilled pin hole for receiving right locking member 210, such as a locking pin. In another embodiment, right spacer 200 has a top portion 202 and a bottom portion 204. Top portion 202 defines right orifice 205, such as a right longitudinal slot. Right spacer 200 has a right flange member 206 affixed to top portion 202 and bottom portion 204. Right orienting bolt 210 is received in central orifice of right upper clamp portion 190. Right locking member 210 is further received in right orifice 205 of right spacer 200 or, in another embodiment, is received in top portion 202 of right spacer 200.

Upper pin 66 is received between within left spacer 100. Upper pin 66 is additionally received within right spacer 200. Additionally spacers may be located within or surrounding left spacer 100 and right spacer 200 as needed.

Left spacer 100 and right spacer 200 are slidably received on upper pin 66 wherein left spacer 100 and right spacer 200 may be moved towards one another to select as narrow configuration (FIG. 2) or may be moved away from one another to select a wide configuration (FIG. 3).

Figure 4:
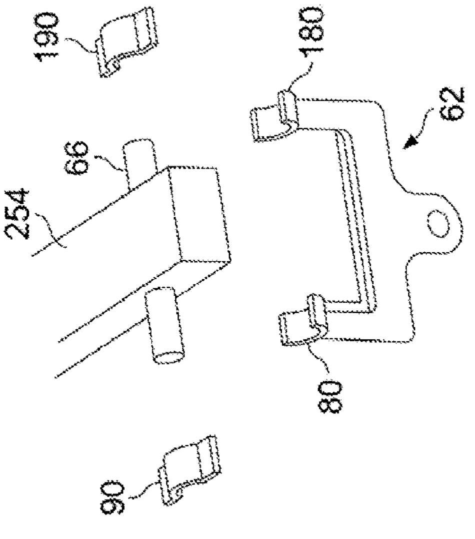
FIG. 4 is an exploded view of the connection between host equipment and the adaptor block of FIGS. 2 and 3.

Referring to FIG. 4, boom 254 of host equipment is shown with upper pin 66 installed. In use, boom 254 locates upper pin 66 into left lower clamp portion 80 and right lower clamp portion 180. If necessary, boom 254 of host equipment can exert downward farce on adapter block 60 for ensuring alignment between upper pin 66 and adapter block 60. Left upper clamp portion 90 may then be affixed to left lower clamp portion 80 and right upper clamp portion 190 may the be affixed to right lower clamp portion 180 for affixing adapter block 60 to boom 254. In this way, all dangerous and heavy lifting is reserved for the host equipment.

Thus, the present invention is well adapted to carry mu the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing, or completing: manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the an to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A vacuum material handler comprising:
an upper pin assembly;
vacuum beam supported by said upper pin assembly, said vacuum beam having a top and a bottom;
a rotator above said vacuum beam;
a vacuum pad beneath said vacuum beam;
a pump above said vacuum pad;
an adapter block in communication with said rotator, said adapter block having a body and a first arm having an upper end;
wherein said first arm has a first lower clamp segment on said upper end that defines a first receiver for receiving said upper pin assembly;
a first upper clamp segment for securing to said first lower clamp segment for securing said upper pin assembly within said first receiver.

2. The vacuum material handler of claim 1 further comprising:
a second arm having an upper end;
wherein said second arm has a second lower clamp segment on said upper end that defines a second receiver for receiving said upper pin assembly;
a second upper clamp segment for securing to said second lower clamp segment for securing said upper pin assembly within said second receiver.

3. The vacuum material handler according to claim 1 further comprising:
a motor above said vacuum pad, said motor operatively connected to said pump.

4. The vacuum material handler according to claim 3 wherein:
said pump and said motor are located within said vacuum beam.

5. The vacuum material handler according to claim 1 wherein:
said adapter block comprises a lower pin receiver for affixing to said rotator.

6. The vacuum material handler according to claim 1 wherein:
said upper pin assembly comprises an upper pin having a first end and a second end;
at least one first spacer received on said upper pin;
said first spacer received between said first upper clamp segment and said first lower clamp segment.

7. The vacuum material handler according to claim 6 wherein:
said first spacer received on said first end of said upper pin; and further comprising
a second spacer received on said second end of said upper pin.

8. The vacuum material handler according to claim 7 wherein:
said second arm has a second lower clamp segment on an upper end that defines a second receiver;
a second spacer on said upper pin is received in said second receiver;
wherein said first spacer and said second spacer are slidably received on said upper pin wherein said first spacer and said second spacer may be moved towards one another to select a narrow setting or may be moved away from one another to select a wide setting for said upper pin assembly.

9. An adapter block configured for connection to a rotator of a vacuum material handler comprising:
a body having a first arm having an upper end;
wherein said first arm has a first lower clamp segment on said upper end that defines a first receiver for receiving an upper pin assembly;
wherein said upper pin assembly has an upper pin defining a first end and a second end;
wherein said first end of said upper pin is received in said first receiver;
a first upper clamp segment for securing to said first lower clamp segment for securing said upper pin assembly within said first receiver;
a first spacer on said upper pin, said first spacer including a flanged end and another end opposite the flanged end, a portion of the another end received between said first upper clamp segment and said first lower clamp segment; and
a lower pin receiver for affixing to the rotator.

10. The adapter block according to claim 9 further comprising:
a second arm having an upper end;
wherein said second arm has a second lower clamp segment on said upper end that defines a second receiver for receiving said upper pin assembly;
wherein said second end of said upper pin is received in said second receiver;
a second upper clamp segment for securing to said second lower clamp segment for securing said upper pin within said second receiver.

11. The adapter block according to claim 9 further comprising:

a lower pin receiver including a bushing.

12. The adapter block according to claim 9 further comprising:

said first spacer including an orifice on an upper surface located toward the another end, the orifice chosen from a cross drilled hole, a longitudinal slot, or a combination thereof.

13. The adapter block according to claim 9 further comprising:

a second spacer received on said second end of said upper pin.

14. The adapter block according to claim 13 further comprising:

a second arm having a second receiver on an upper end of said second arm;

said second spacer received in said second receiver;

wherein said first spacer and said second spacer are slidably received on said upper pin wherein said first spacer and said second spacer may be moved towards one another to select a narrow setting or may be moved away from one another to select a wide setting for said upper pin assembly.

15. An adapter block configured for connection, at an upper end, to an upper pin connectable to a host piece of equipment and, at a lower end, to a lower pin connectable to a rotator of a vacuum material handler, the adapter block comprising:

a body having a first arm and a second arm, the first and second arms each having an upper end that includes a lower clamp segment that defines a receiver for a corresponding end of the upper pin and a lower clamp segment for securing the corresponding end within the receiver;

a first and a second spacer each sized to slidably receive the corresponding end of the upper pin, the first and second spacers each including a flanged end and another end opposite the flanged end, the another end received between the upper and lower clamp segments; and a lower pin receiver sized to receive the lower pin;

wherein the first and second spacers may be moved towards one another to select a narrow setting or may be moved away from one another to select a wide setting.

16. The adapter block of claim 15, wherein the first and second spacers each include an orifice on an upper surface.

17. The adapter block of claim 16, wherein the orifice is chosen from a cross drilled hole, a longitudinal slot, or a combination thereof.

* * * * *